(12) United States Patent
Gamble et al.

(10) Patent No.: US 6,231,224 B1
(45) Date of Patent: May 15, 2001

(54) LIGHT PIPE GUIDE AND CARRIER FOR HARD DISK DRIVE

(75) Inventors: Eric T. Gamble; Edward J. McNulty, both of Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/401,210

(22) Filed: Sep. 22, 1999

(51) Int. Cl.[7] .................................................. F21V 8/00
(52) U.S. Cl. .......................... 362/551; 362/85; 362/133; 361/685
(58) Field of Search ..................... 362/551, 559, 362/560, 85, 89, 132, 133, 234, 253; 361/685, 727, 735; 116/202

(56) References Cited

U.S. PATENT DOCUMENTS

| | | | |
|---|---|---|---|
| 4,692,842 | 9/1987 | Joly et al. | 361/413 |
| 5,340,340 | 8/1994 | Hastings et al. | 439/64 |
| 5,579,204 | 11/1996 | Nelson et al. | 361/685 |
| 5,654,873 | 8/1997 | Smithson et al. | 361/685 |
| 5,721,838 | 2/1998 | Takahashi et al. | 395/283 |
| 5,764,481 | 6/1998 | Ruch et al. | 361/685 |
| 5,790,374 * | 8/1998 | Wong | 361/685 |
| 6,061,244 * | 5/2000 | O'Sullivan et al. | 361/727 |
| 6,064,569 | 5/2000 | Sands et al. | 361/685 |
| 6,071,150 | 6/2000 | Tang et al. | 439/638 |
| 6,084,768 | 7/2000 | Bolognia | 361/685 |
| 6,088,221 | 7/2000 | Bolognia | 361/685 |
| 6,098,127 | 8/2000 | Kwang | 710/62 |

* cited by examiner

Primary Examiner—Alan Cariaso
(74) Attorney, Agent, or Firm—Bracewell & Patterson, LLP

(57) ABSTRACT

A carrier for a hot-pluggable hard disk drive has a frame with a pair of side walls, a front bezel, and a rear connector assembly. The hard disk drive mounts to the frame within its confines. One of the side walls has a pair of channels in its outer surface. The carrier also has a visible light pipe mounted in each of its channels. The light pipes extend along the side wall from the front bezel to the rear connector assembly. The carrier is installed in the hard disk drive docking bay of a computer system. The rear end of the docking bay has a docking connector for interconnecting with the drive, and a pair of activity lights. When the carrier is seated in the docking bay, the rear ends of the light pipes are precisely aligned with the activity lights and separated from them by a small clearance. The light emitted by the activity lights is transmitted through the light pipes and displayed at the front bezel for viewing by the user.

24 Claims, 5 Drawing Sheets

LIGHT PIPE GUIDE AND CARRIER FOR HARD DISK DRIVE

BACKGROUND OF THE INVENTION

1. Technical Field

This invention relates in general to hard disk drives and in particular to a hard disk drive carrier with light pipe guides for the drive activity lights.

2. Background Art

Hard disk drives (HDD) that are removable during operation in a computer or peripheral systems environment are sometimes referred to as "hot-pluggable." An HDD is typically mounted in a hard disk drive carrier prior to installation in a system. An HDD carrier is a frame-like structure which attaches to the HDD to assist in its insertion into or removal from the system. HDD carriers also protect the HDD when it is outside of the systems environment. HDD carriers are typically constructed out of metal and/or polymeric materials.

The system contains several HDD's, each of which may be readily interchangeable in the system. The HDD's are mounted in bays in a chassis located within a system enclosure. The system typically has an activity light or lights for each bay that indicate operational functions. Unfortunately, the lights are usually located at the rear of the enclosure and not visible once the HDD and carrier assembly is installed. Thus, an apparatus and method for coupling a hot-pluggable drive in a system and monitoring the activity lights of the system while the drive is in operation is needed.

SUMMARY OF THE INVENTION

A carrier for a hot-pluggable hard disk drive has a frame with a pair of side walls, a front bezel, and a rear connector assembly. The hard disk drive mounts to the frame within its confines. One of the side walls has a pair of channels in its outer surface. The carrier also has a visible light pipe mounted in each of its channels. The light pipes extend along the side wall from the front bezel to the rear connector assembly. The rear ends of the light pipes are vertically aligned and their front ends are horizontally aligned.

The carrier is installed in the hard disk drive docking bay of a computer system. The rear end of the docking bay has a docking connector for interconnecting with the drive, and a pair of activity lights. When the carrier is seated in the docking bay, the rear ends of the light pipes are precisely aligned with the activity lights and separated from them by a small clearance. The light emitted by the activity lights is transmitted through the light pipes and displayed at the front bezel for viewing by the user.

BRIEF DESCRIPTION OF THE DRAWINGS

So that the manner in which the features, advantages and objects of the invention, as well as others which will become apparent, are attained and can be understood in more detail, more particular description of the invention briefly summarized above may be had by reference to the embodiment thereof which is illustrated in the appended drawings, which drawings form a part of this specification. It is to be noted, however, that the drawings illustrate only a preferred embodiment of the invention and is therefore not to be considered limiting of its scope as the invention may admit to other equally effective embodiments.

BEST MODE FOR CARRYING OUT THE INVENTION

Figure 1:
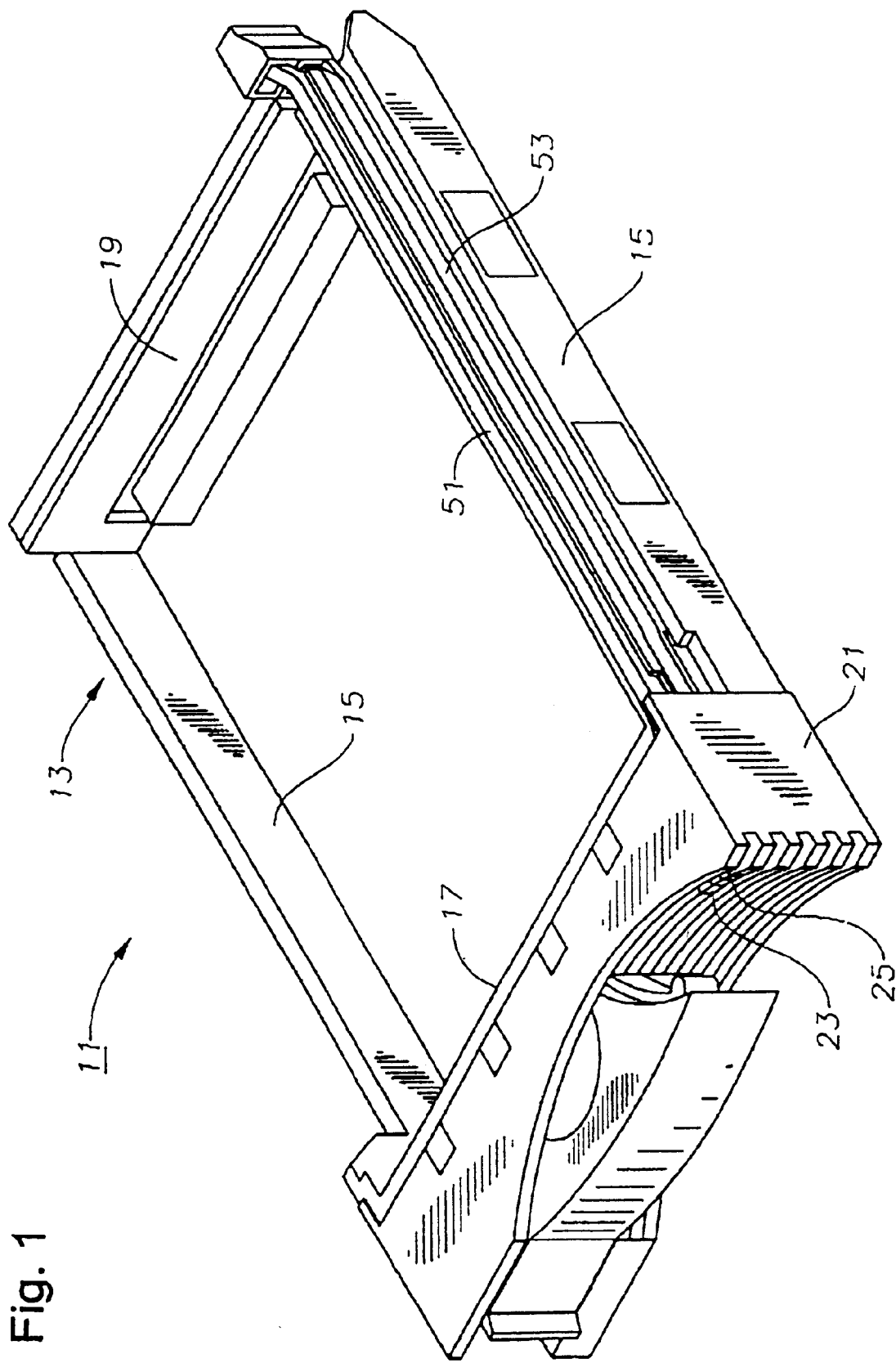
FIG. 1 is a front isometric view of a hard disk drive carrier constructed in accordance with the invention.
Figure 2:
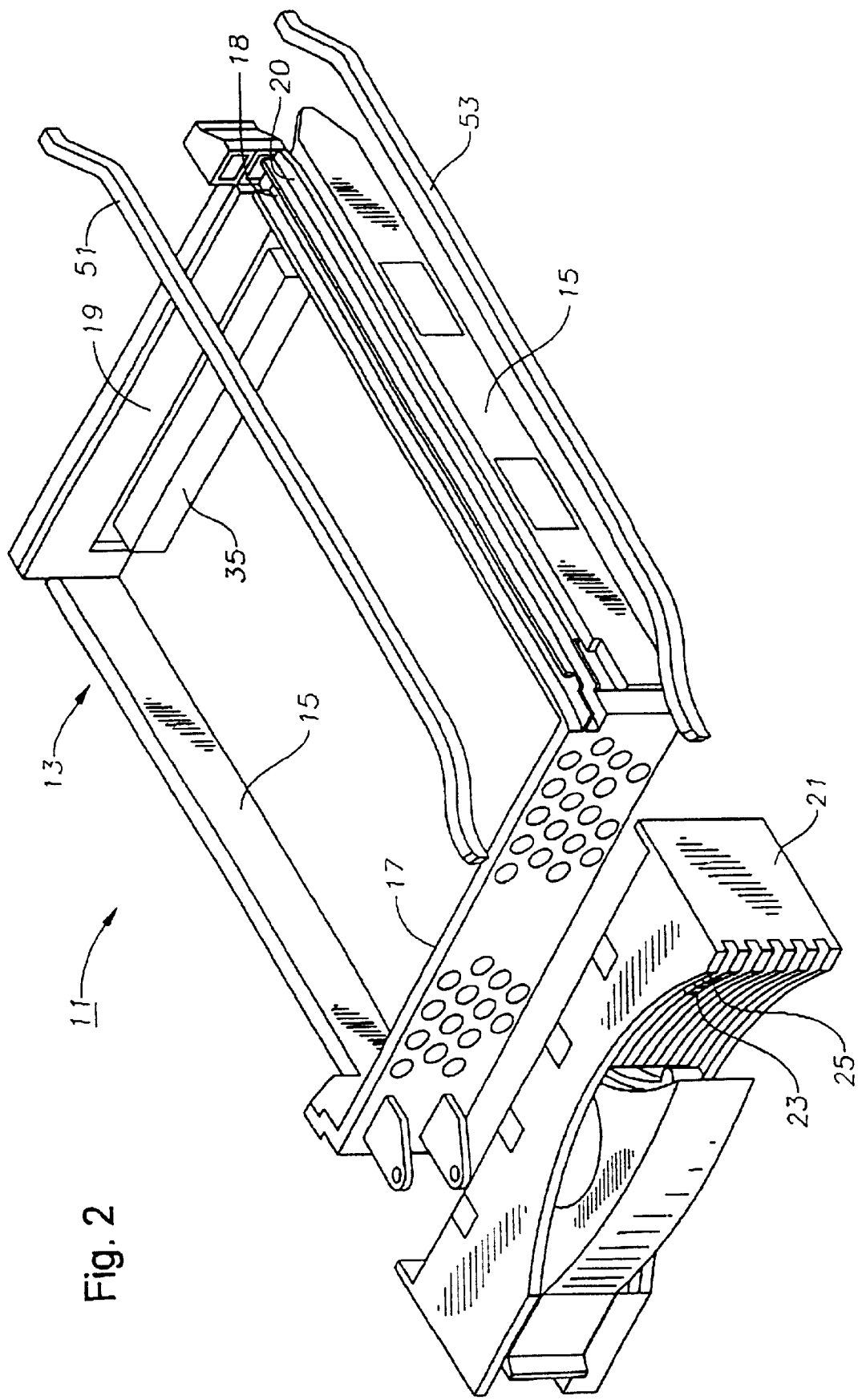
FIG. 2 is an exploded front isometric view of the drive carrier of FIG. 1.

Referring to FIGS. 1 and 2, a carrier 11 for a hot-pluggable hard disk drive is shown. Carrier 11 has a rigid, generally rectangular frame 13 with a pair of side walls 15, a front end 17, and a rear end 19. In one embodiment, frame 13 is zinc plaster cast and its side walls 15 and ends 17, 19 are orthogonal relative to each other. The hard disk drive (not shown) mounts to frame 13 within its confines.

The longitudinal outer surface of one of the side walls 15 has a pair of substantially parallel, square-shaped guide rails or channels 18, 20 with orthogonal surfaces. Channel 18 has three orthogonal support surfaces, including an upturned flange at its outer edge, and has an open top. Channel 20 also has three orthogonal support surfaces with an open side. A bezel 21 is mounted to front end 17 of frame 13 and has a pair of generally rectangular apertures 23, 25 (FIG. 2) that extend through it to its scalloped front surface. Apertures 23, 25 are horizontally oriented side by side in bezel 21.

Figure 9:
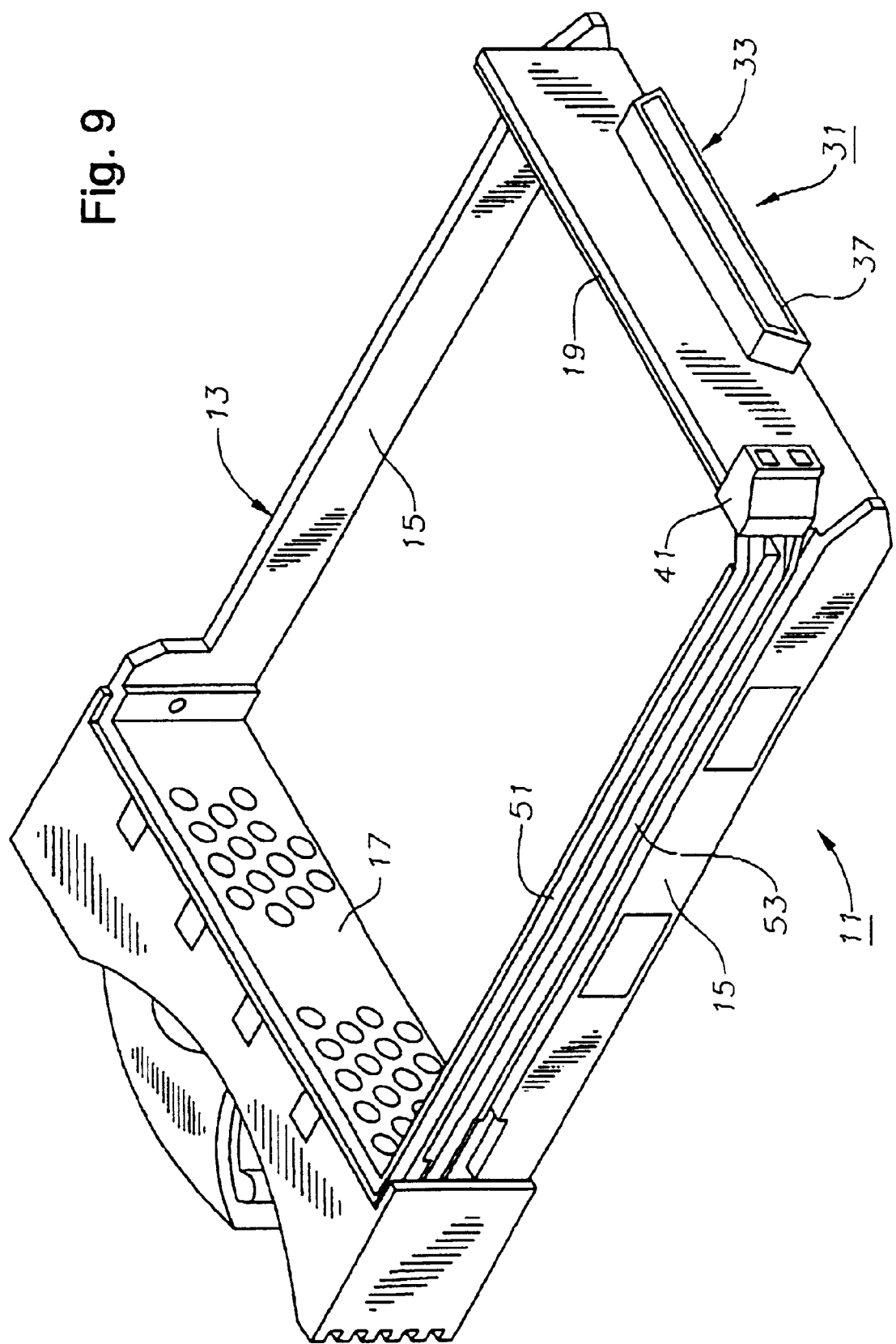
FIG. 9 is a rear isometric view of the drive carrier of FIG. 1.
Figure 10:
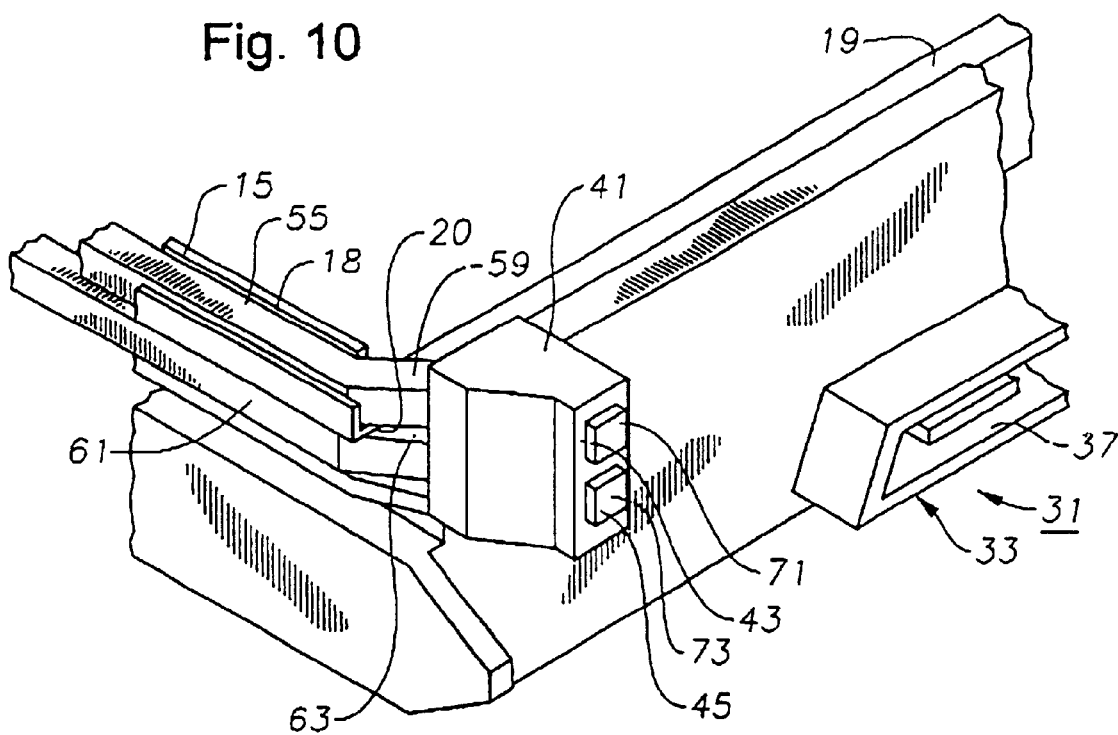
FIG. 10 is an enlarged rear isometric view of the drive carrier of FIG. 1.
Figure 11:
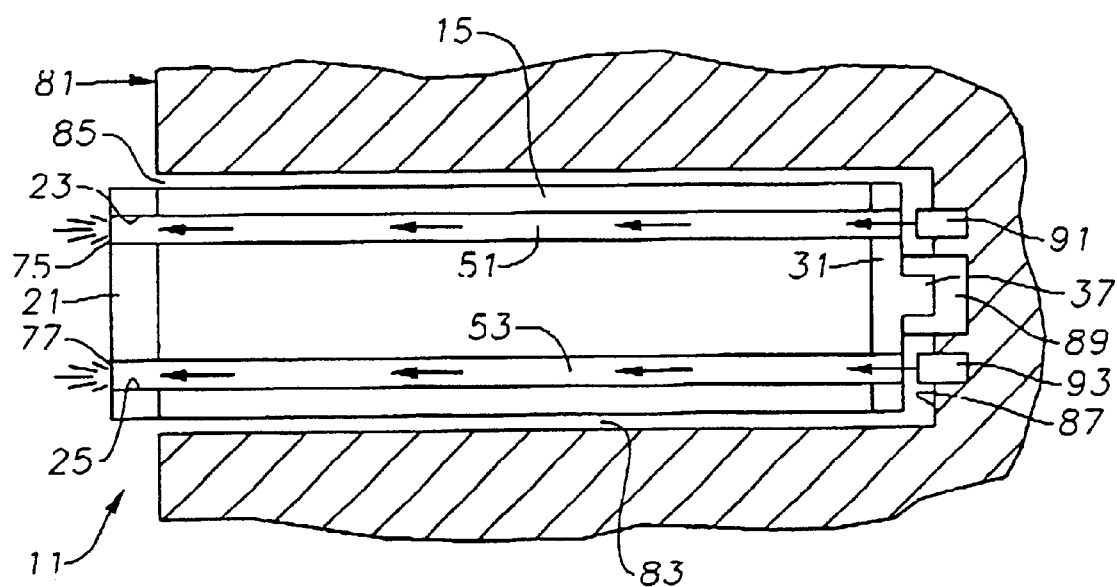
FIG. 11 is a simplified, schematic sectional side view of the drive carrier of FIG. 5 loaded in a computer system.

As shown in FIGS. 9 and 10, a generally rectangular connector assembly 31 is mounted to the rear end 19 of frame 13. Connector assembly 31 has a connector 33 for electrically coupling the hard disk drive to a computer system. A front portion 35 of connector 33 (FIG. 2) interconnects to the disk drive, and a rear portion 37 interconnects to the computer system. Connector assembly 31 also comprises a retainer 41 located along one of its upper outer corners. Retainer 41 is a plastic shroud with a pair of tapered holes 43, 45 that are separated by a partition and oriented one on top of the other. The front ends of holes 43, 45 are wider and taper down to their respective rearward ends (FIG. 10).

Figure 3:
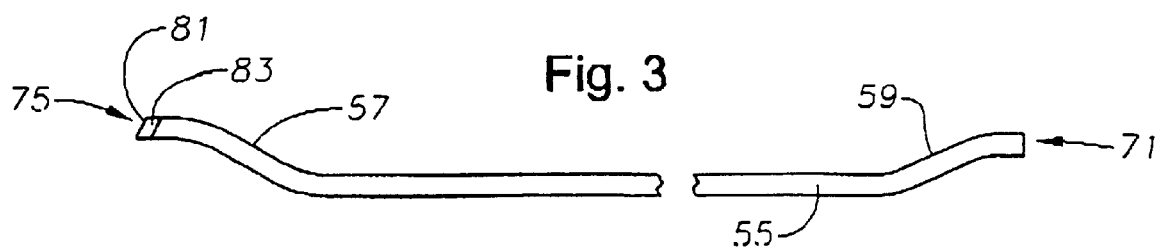
FIG. 3 is a top view of a first light conduit for the carrier of FIG. 1.
Figure 4:
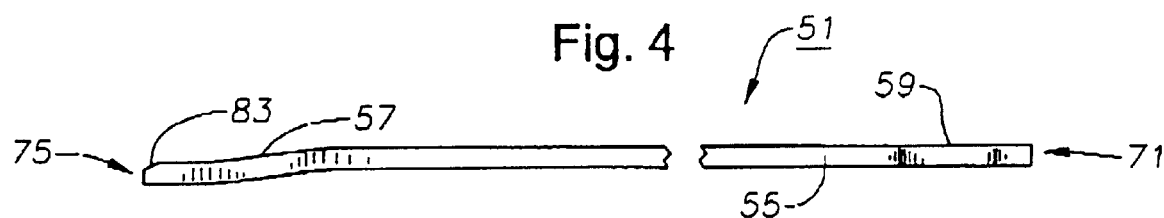
FIG. 4 is a side view of the first light conduit of FIG. 3.

Carrier 11 also comprises a pair of visible light conduits or pipes 51, 53 (FIG. 2). As shown in FIGS. 3–8, pipes 51, 53 are fairly similar in shape and are preferably constructed from solid square rods of clear acrylic. Pipe 51 has a long, substantially linear central portion 55, and front and rear portions 57, 59 that are angled and offset from central portion 55 as shown (FIGS. 3 and 4). Pipe 51 is configured in this manner so that, in operation, the direction of light transmission may be redirected to a desired location.

Figure 5:
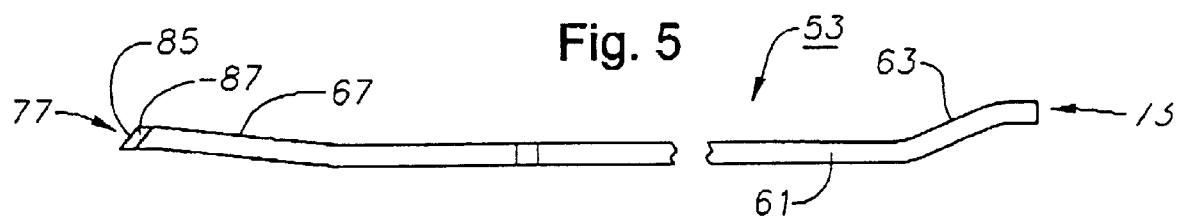
FIG. 5 is a top view of a second light conduit for the carrier of FIG. 1.
Figure 6:
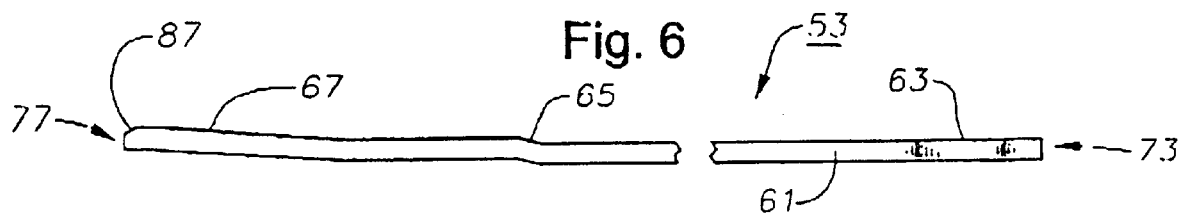
FIG. 6 is a side view of the second light conduit of FIG. 5

As shown in FIGS. 5 and 6, pipe 53 has central and rear portions 61, 63 that are virtually identical to those portions 55, 59 of pipe 51, respectively, except for a small hitch 65 in central portion 61. The front portion 67 of pipe 53 angled and offset less dramatically than portion 57 of pipe 51. The rear ends 71, 73 of pipes 51, 53, respectively, are orthogonally oriented relative to their longitudinal axes and four outer square surfaces. However, each of the front ends 75, 77 of pipes 51, 53 has a pair of tapers. Front end 75 of pipe 51 has a front taper 81 from its outer edge to its inner edge, and a top taper 83 from its top leading edge rearward. Similarly, front end 77 of pipe 53 has a front taper 85 from its outer edge to its inner edge, and a top taper 87 from its top leading edge rearward.

Figure 7:
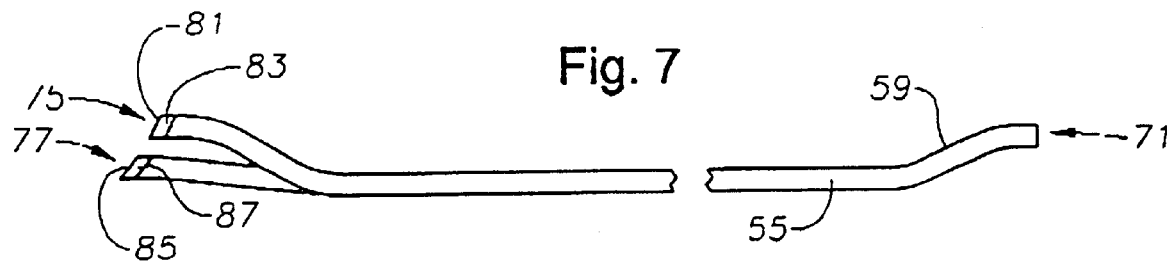
FIG. 7 is a top view of the first and second light conduits of FIGS. 3–6 illustrating their orientation relative to each other.
Figure 8:
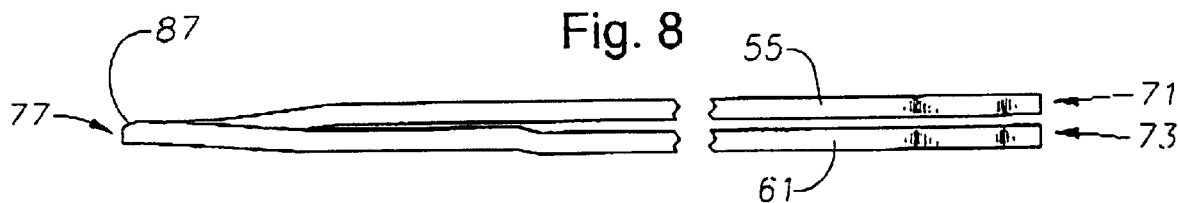
FIG. 8 is a side view of the first and second light conduits of FIGS. 3–6 illustrating their orientation relative to each other.

Referring now to FIGS. 7 and 8, the geometries of pipes 51, 53 are selected to reconfigure their original orientation. Note that the rear ends 71, 73 of pipes 51, 53 are substantially vertically aligned and the front ends 75, 77 of pipes 51, 53 are substantially horizontally aligned. It is the previously described angles and offsets of the various portions of pipes 51, 53 that change the alignment. In addition, pipe 51 is slightly shorter than pipe 53 (FIG. 7) to accommodate for the scalloped front surface of bezel 21 of this particular embodiment. Pipes 51, 53 are perfectly contoured for this particular application, but may be sized and shaped to fit almost any geometry.

In operation (FIG. 1), light pipes 51, 53 are mounted in channels 18, 20 in the side wall 15 of base 13. Three of the four sides of each pipe 51, 53 locate against the orthogonal surfaces of the channels 18, 20, respectively. The rear portions 59, 63 of pipes 51, 53 are captured in holes 43, 45, respectively, of retainer 41 such that their rear ends 71, 73 are substantially flush therewith. Likewise, the front portions 57, 67 of pipes 51, 53 are captured in apertures 23, 25, respectively, of bezel 21 such that their front ends 75, 77 are substantially flush with the scalloped front surface of bezel 21. After a hard disk drive is mounted in frame 13, carrier 11 is ready for use.

As shown schematically in FIG. 7, carrier 11 is designed to be used in a computer system 81 having a hard disk drive docking bay 83. Docking bay 83 has a front end 85 that receives carrier 11, and a rearward end 87 with a docking connector 89 on a circuit board. Docking connector 89 is provided for engaging the rear portion 37 of connector 33 on carrier 11.

A pair of vertically disposed LED activity lights 91, 93 are also located at the rearward end 87 of docking bay 83 on the circuit board. When carrier 11 is properly seated in docking bay 83, the rear ends 71, 73 are precisely aligned with lights 91, 93, respectively, and axially separated by a small clearance. The visible light emitted by lights 91, 93 is transmitted through pipes 51, 53 along the side wall 15 of carrier 11 and displayed at front ends 75, 77, respectively. Thus, even though lights 91, 93 are covered or blocked by carrier 11, the light they emit is viewable from the front side of carrier 11. This enables users to monitor the activity of the hard disk drive interactions with computer system 81.

The invention has several advantages. This carrier utilizes two or more outboard light pipes that are capable of changing the orientation of the activity lights to any configuration. The special tapers at the front end of the light pipes by the bezel also maximize visibility of the light emitted. The design is also simple, less expensive, and is a unique way of aligning the light pipes in tight dimensional control with respect to the bezel and connector that will dock to the same circuit board containing the LED's that feed the light pipes. The tunnel-like design of the retainer traps, guides, supports, and aligns the ends of the light pipes without adding any parts or requiring additional tooling. By linking the dimensional control of the connector to the light pipes in the same part, better tolerance control is gained for aligning the light pipes. The compact size of the overall design also achieves the most aggressive packaging in the industry for hot plug hard disk drives.

While the invention has been shown or described in only some of its forms, it should be apparent to those skilled in the art that it is not so limited, but is susceptible to various changes without departing from the scope of the invention.

We claim:

1. A carrier for a computer system hard disk drive, the computer system having an enclosure, a docking bay located within the enclosure for receiving the carrier, and at least one activity light associated with the docking bay and located at a rearward end of the docking bay, the carrier comprising:

a frame having a front end, a rear end, and a side wall extending therebetween, the frame being adapted to support a hot-pluggable hard disk drive between the front end, rear end, and side wall;

a bezel mounted adjacent to the front end of the frame;

a retainer mounted adjacent to the rear end of the frame;

at least one light conduit mounted adjacent to an outer surface of the side wall of the frame such that a front end of the conduit is mounted to the bezel, and a rear end of the conduit is mounted to the retainer; and wherein the retainer is adapted to align the rear end of the conduit with and in close proximity to said at least one activity light in the docking bay so that light emitted by the activity light is transmitted to the front end of the conduit and is visible from a position in front of the bezel.

2. The carrier of claim 1 wherein the light conduit is mounted within a longitudinal slot in the outer surface of the side wall.

3. The carrier of claim 1 wherein the bezel has an aperture that the front end of the light conduit is mounted in.

4. The carrier of claim 1 wherein the light conduit is a solid pipe formed from clear acrylic.

5. The carrier of claim 1 wherein said at least one conduit comprises a pair of conduits, and wherein the frame has a vertical axis, a horizontal axis, the rear ends of the conduits are vertically oriented relative to each other, and the front ends of the conduits are horizontally oriented relative to each other.

6. The carrier of claim 1 wherein the frame further comprises a connector assembly mounted adjacent to the rear end of the frame, the connector assembly having a connector that is adapted to electrically couple the hard disk drive to the computer system, and wherein the retainer is integrally formed with the connector assembly.

7. The carrier of claim 1 wherein the retainer comprises a shroud with an opening for capturing the rear end of the light conduit.

8. The carrier of claim 1 wherein the front and rear ends of the conduit are substantially flush with the bezel and the retainer, respectively.

9. The carrier of claim 1 wherein the light conduit is nonlinear along its length and has a rectangular cross-sectional shape.

10. The carrier of claim 9 wherein the light conduit is mounted within a longitudinal channel in the outer surface of the side wall, the channel having first and second spaced-apart flanges for locating the light conduit within the channel so that outer surfaces of the conduit abut the flanges and the side wall.

11. The carrier of claim 1 wherein the light conduit has a front portion, a central portion, and a rear portion, wherein the central portion is substantially linear and the front and rear portions are angled relative to and offset from the central portion.

12. The carrier of claim 1 wherein the front end of the light conduit is tapered to maximize viewability of the light emitted by the activity light.

13. A carrier for a computer system hard disk drive, the computer system having an enclosure, a docking bay located within the enclosure for receiving the carrier, and a pair of activity lights associated with the docking bay and located at a rearward end of the docking bay, the carrier comprising:
   a frame having a front end, a rear end, and a side wall extending therebetween, the side wall having an outer surface with a longitudinal slot extending between the ends, and the frame being adapted to support a hot-pluggable hard disk drive;
   a a bezel mounted adjacent to the front end of the frame and having an aperture;
   a retainer mounted adjacent to the rear end of the frame;
   a pair of light conduits formed from solid pipes of acrylic, wherein the conduits are mounted in the slot in the outer surface of the side wall, and wherein the front ends of the conduits are mounted in the aperture of the bezel, and the rear ends of the conduits are mounted to the retainer; and wherein
   the retainer is adapted to align each of the rear ends of the conduits with and in close proximity to a respective one of the activity lights in the docking bay so that light emitted by the activity lights is transmitted to the front ends of the conduits and is visible from a position in front of the bezel; and wherein
   each of the light conduits has a front portion, a central portion, and a rear portion, the central portions being substantially linear and the front and rear portions being angled relative to and offset from their respective central portions.

14. The carrier of claim 13 wherein the frame has a vertical axis, a horizontal axis, the rear ends of the conduits are vertically oriented relative to each other, and the front ends of the conduits are horizontally oriented relative to each other.

15. The carrier of claim 13 wherein the frame further comprises a connector assembly mounted adjacent to the rear end of the frame, the connector assembly having a connector that is adapted to electrically couple the hard disk drive to the computer system, and wherein the retainer is integrally formed with the connector assembly.

16. The carrier of claim 13 wherein the retainer comprises a shroud with an opening for capturing the rear ends of the light conduits.

17. The carrier of claim 13 wherein the front and rear ends of the conduits are substantially flush with the bezel and the retainer, respectively.

18. The carrier of claim 13 wherein the light conduits are rectangular in cross-section.

19. The carrier of claim 18 wherein the slot in the side wall comprises a pair of channels, each having first and second spaced-apart flanges, and wherein one of the light conduits locate within each of the channels such that outer surfaces of the conduits abut the flanges and the side wall.

20. The carrier of claim 13 wherein each of the front ends of the light conduits has a pair of tapers to maximize viewability of the light emitted by the activity lights, and the rear ends of the light conduits are substantially orthogonal to axes of the light conduits.

21. A carrier for a computer system hard disk drive, the computer system having an enclosure, a docking bay located within the enclosure for receiving the carrier, and a pair of activity lights associated with the docking bay and located at a rearward end of the docking bay, the carrier comprising:
   a frame having a front end, a rear end, and a side wall extending therebetween, the side wall having an outer surface with a pair of slots and the frame being adapted to support a hot-pluggable hard disk drive;
   a connector mounted to the rear end of the frame and adapted to electrically couple the hard disk drive to the computer system;
   a solid acrylic light pipe having a rectangular cross-section mounted in each of the slots in the side wall, each of the pipes having a front portion with a front end, a rear portion with a rear end, and a substantially linear central portion therebetween, the front and rear portions being angled relative to and offset from the central portion, and wherein the front ends of the light pipes are tapered to maximize viewability of the light emitted by the activity lights, and the rear ends of the pipes are substantially orthogonal to axes of the pipes;
   a bezel mounted to the front end of the frame and having a pair of apertures for supporting the front ends of the pipes; and
   a retainer extending from the connector and having a pair of openings for supporting the rear ends of the pipes, the retainer also being adapted to align each of the rear ends of the pipes with and in close proximity to a respective one of the activity lights in the docking bay so that light emitted by the activity lights is transmitted to the front ends of the pipes and is visible from a position in front of the bezel.

22. The carrier of claim 21 wherein the frame has a vertical axis, a horizontal axis, the rear ends of the pipes are vertically oriented relative to each other, and the front ends of the pipes are horizontally oriented relative to each other.

23. The carrier of claim 21 wherein the front and rear ends of the pipes are substantially flush with the bezel and the retainer, respectively.

24. The carrier of claim 21 wherein each of the slots in the side wall have first and second spaced-apart flanges that abut outer surfaces of the pipes.

* * * * *